United States Patent
Wentworth et al.

(10) Patent No.: US 10,415,722 B2
(45) Date of Patent: Sep. 17, 2019

(54) SPLIT RING RAM ADAPTER WITH CAM ADJUSTMENT

(71) Applicant: Earth Tool Company LLC, Lake Mills, WI (US)

(72) Inventors: Steven W. Wentworth, Scottsdale, AZ (US); Robert F. Crane, Nekoosa, WI (US); Mark D. Randa, Oconomowoc, WI (US)

(73) Assignee: Earth Tool Company LLC, Lake Mills, WI (US)

( * ) Notice: Subject to any disclaimer, the term of this patent is extended or adjusted under 35 U.S.C. 154(b) by 0 days.

(21) Appl. No.: 16/058,665

(22) Filed: Aug. 8, 2018

(65) Prior Publication Data

US 2019/0049042 A1 Feb. 14, 2019

Related U.S. Application Data

(60) Provisional application No. 62/544,217, filed on Aug. 11, 2017.

(51) Int. Cl.
| | |
|---|---|
| *F16L 1/036* | (2006.01) |
| *F16L 1/028* | (2006.01) |
| *F16L 1/06* | (2006.01) |
| *F16B 7/04* | (2006.01) |

(52) U.S. Cl.
CPC .............. *F16L 1/06* (2013.01); *F16B 7/0413* (2013.01); *F16L 1/028* (2013.01); *F16L 1/036* (2013.01)

(58) Field of Classification Search
CPC ............ F16L 1/028; F16L 1/036; F16L 55/18

USPC ......................... 405/184, 184.1, 184.2, 184.3
See application file for complete search history.

(56) References Cited

U.S. PATENT DOCUMENTS

| | | | |
|---|---|---|---|
| 4,329,077 A | 5/1982 | Bouplon | |
| 4,460,050 A * | 7/1984 | Schmidt | E02D 13/10 173/128 |
| 4,650,374 A * | 3/1987 | Schmidt | E02D 7/02 173/128 |
| 4,671,703 A | 6/1987 | Schmidt | |
| 5,110,237 A * | 5/1992 | Hesse | E02D 13/10 173/128 |
| 5,112,158 A | 5/1992 | McConnell | |
| 5,240,352 A * | 8/1993 | Ilomaki | E21B 7/205 175/62 |
| 5,494,116 A * | 2/1996 | Wentworth | E21B 4/145 173/17 |
| 7,398,785 B2 | 7/2008 | Harr | |
| 7,559,722 B2 | 7/2009 | Crane | |
| 7,721,375 B2 | 5/2010 | Harr | |
| 7,725,978 B2 | 6/2010 | Harr | |

(Continued)

*Primary Examiner* — Frederick L Lagman
(74) *Attorney, Agent, or Firm* — Tomlinson McKinstry, P.C.

(57) ABSTRACT

An adapter may be used to impart ramming force on a pipe having a larger diameter than the ramming tool. The adapter has a set of collets which interface with a conical nose on the ramming tool. The adapter further has a split ring that engages with the pipe and either the collet set or an intermediate cone. The split ring has gaps which are bridged by a cam connector. The cam connector may, through rotation of a cam pin, modify the size of the gaps in the split ring. Expansion of the split ring within a pipe allows the ring to hold its position without relying on a weldment or other more permanent connection.

17 Claims, 9 Drawing Sheets

(56) References Cited

U.S. PATENT DOCUMENTS

| | | |
|---|---|---|
| 7,914,233 B2 | 3/2011 | Crane |
| 7,993,078 B2 | 8/2011 | Crane |
| 8,303,215 B2 | 11/2012 | Harr |
| 8,347,446 B2 | 1/2013 | Harr |
| 8,545,130 B2 | 10/2013 | Harr |
| 8,556,539 B2 * | 10/2013 | Harr ........................ E21B 7/205 |
| | | 405/184.1 |
| 9,651,167 B2 | 5/2017 | Harr |
| 2002/0081155 A1 * | 6/2002 | Putnam ............... F16L 55/1658 |
| | | 405/184 |
| 2006/0018717 A1 * | 1/2006 | Huncovsky ............ F16L 1/028 |
| | | 405/184.4 |
| 2006/0243303 A1 | 11/2006 | Harr |
| 2008/0193220 A1 | 8/2008 | Crane |
| 2012/0087739 A1 | 4/2012 | Harr |
| 2014/0112721 A1 | 4/2014 | Harr |
| 2015/0369394 A1 | 12/2015 | Harr |
| 2017/0045175 A1 | 2/2017 | Clarke et al. |

* cited by examiner

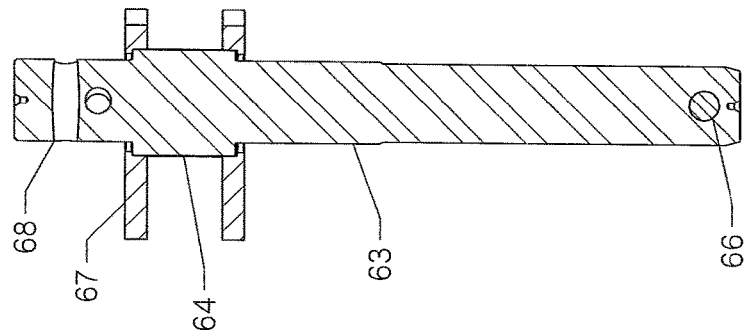
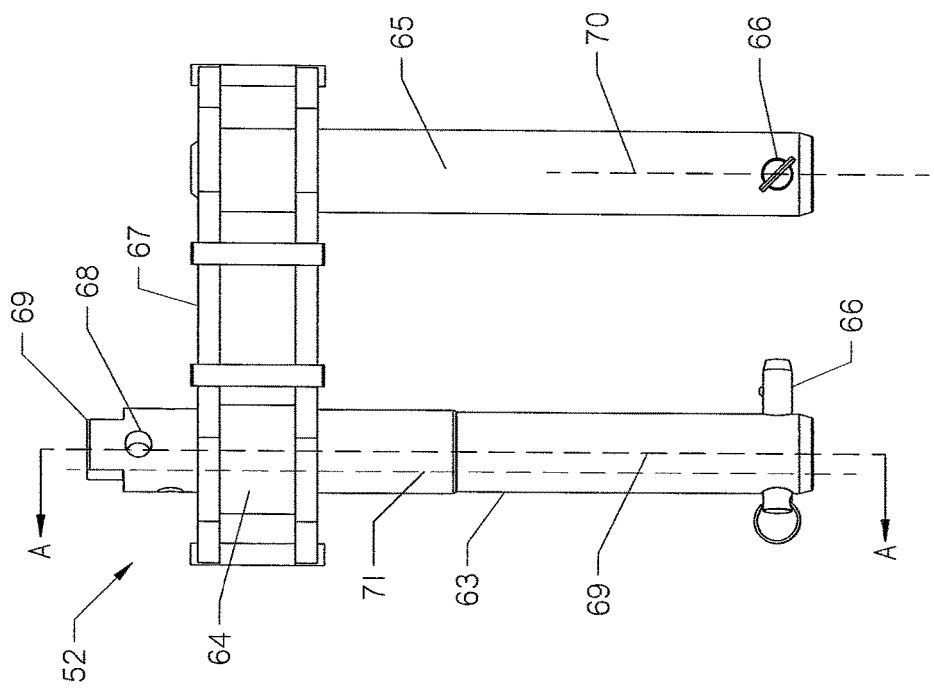
FIG. 6B
FIG. 6A

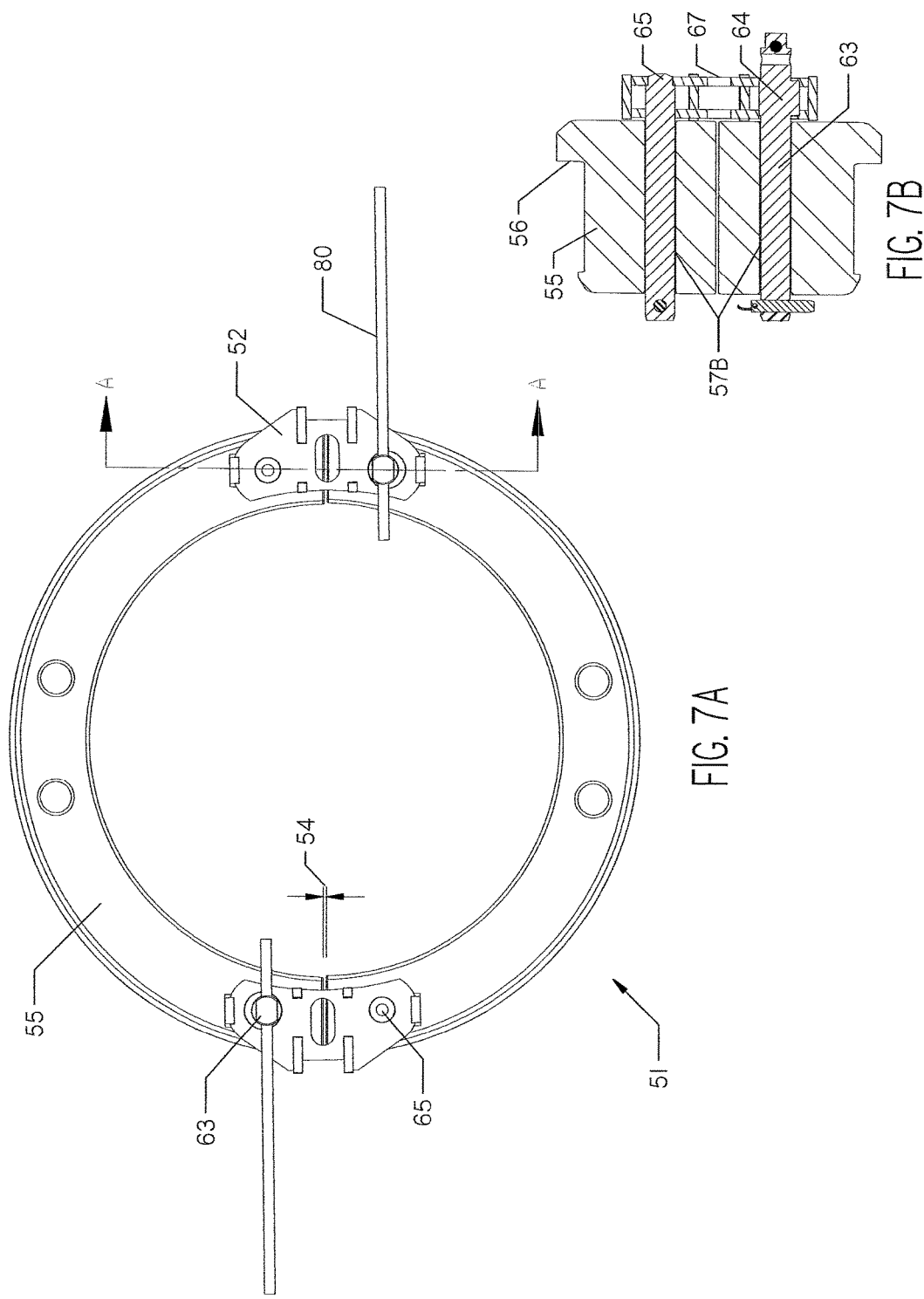

SPLIT RING RAM ADAPTER WITH CAM ADJUSTMENT

FIELD

The present invention relates generally to devices for installation of pipe segments under the ground.

BACKGROUND

Steel casing pipe is often percussively rammed horizontally under expressways, boulevards, railways and other heavily traveled roadways to provide passage for buried utilities such as potable water, sanitary sewer, storm sewer and natural gas pipelines. The steel pipe is most commonly used as a jacket for the carrier pipe and therefore allows multiple utilities to pass through a single crossing pipe. The process of pipe ramming, a well-accepted method within the trenchless technology family of construction processes, allows said steel casing to be placed beneath an active roadway without the undesirable consequences of shutting down the flow of traffic.

As the crossings are often shared by multiple mainline utilities, the casings may be large in cross sectional diameter; 36 inch to 72 inch diameter is fairly common and casings up to 120 inches have been installed, though less frequently. The percussive rammer typically has a cross section that is also cylindrical, like the pipe. The rammer is smaller, between 20% and 75% of the casing diameter. Adaptation must be made between the rammer and the casing face to transfer the percussive load. When the hammer diameter is small compared to the casing diameter, the adapter design and handling becomes a challenge. This is especially true in casings over 48" diameter.

Thus, an adapter must be able to transfer force from the rammer to the casing. Components of such an adapter, especially when they are segmented, may be difficult to handle. The components must be assembled into the inside of the distal end of the casing such that the percussive blows of the hammer will be transmitted to the casing and drive it through the soil under the roadway. When multiple adapters are needed for large casings, these problems multiply. Components may need to be welded to the casing in order to ensure a proper connection during the ramming process. Welding takes time and is expensive. The present invention seeks to overcome these challenges.

SUMMARY

The present invention is directed to a kit. The kit comprises a split ring, two bridge connectors, and a plurality of collets. The split ring comprises a first ring portion and a second ring portion. The first ring portion defines a convex outer surface and a concave inner surface, each of the convex outer surface and concave inner surface extending from a first end to a second end. The second ring portion defines a convex outer surface and a concave inner surface, each of the convex outer surface and concave inner surface extending from a first end to a second end. The bridge connectors have a first pin connectable to an end of the first support, a second pin connectable to an end of the second support, and a middle section connecting the first pin and the second pin. The first pin is rotatable relative to the middle section and comprises an elongate pin end and an upset portion. The upset portion has a longitudinal axis that is offset from a longitudinal axis of the pin end. The collets have an outer surface and an inner surface complementary to the surface of a cone.

The present invention is further directed to a system. The system comprises a pipe segment, a split ring comprising a first ring segment and a second ring segment, and a means for adjusting a gap between the first ring segment and the second ring segment. The pipe segment has an end characterized by an opening and an interior surface. The first ring segment and second ring segment are each disposed along an arcuate path from a first end to a second end and have a convex surface and concave surface extending from the arcuate path. The convex surface of the first ring segment and the second ring segment conform to a portion of the interior surface of the pipe segment.

The present invention is further directed to a method. The method comprises placing two portions of a split ring within a section of pipe, spreading the two portions apart such that the split ring bears against the inner surface of the section of pipe, placing a set of collets within the split ring, placing a conical nose of a pneumatic hammer within the set of collets, and reciprocating the pneumatic hammer in a first direction such that the section of pipe is driven into the ground.

BRIEF DESCRIPTION OF THE DRAWINGS

FIG. 6A is a side plan view of a cam connector.

FIG. 6B is a sectional view of the cam connector of FIG. 6A taken along line A-A.

FIG. 7A is a front view of a split ring with a cam connector in a minimum condition.

FIG. 7B is a sectional view of the split ring and connector of FIG. 7A along line A-A.

DETAILED DESCRIPTION

Figure 1:
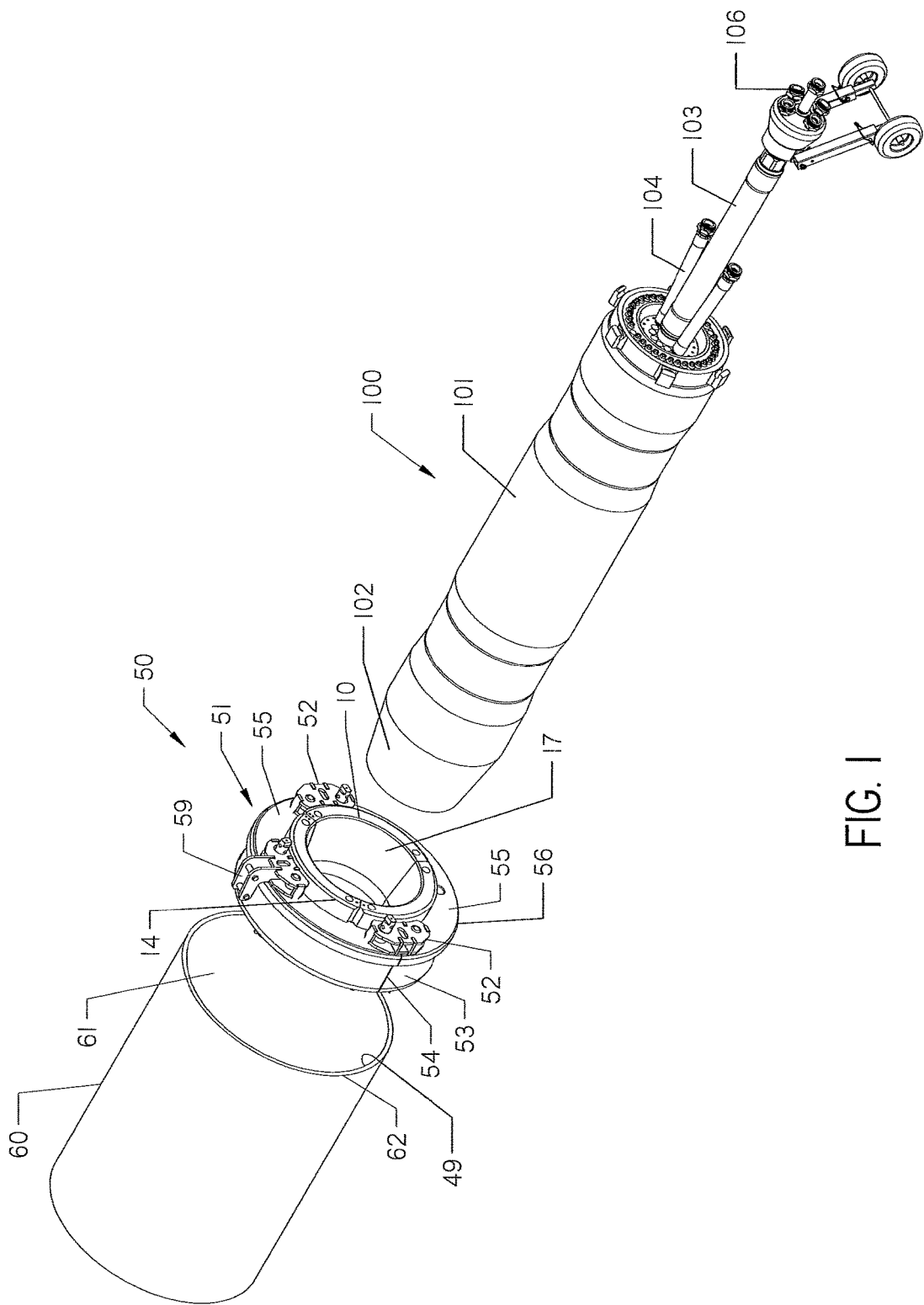
FIG. 1 is a partially exploded view of an adapter kit for use with a pipe ramming apparatus and a pipe segment.

With reference to the Figures, a ramming apparatus 100 is shown with an adapter kit 50. The adapter kit 50 is made up for use in the opening 61 of a culvert or pipe section 60. The pipe section 60 has a face 62 surrounding the opening 61, and an inner surface 49. While the opening 61 is often intended to be circular, it should be understood that manufacturing, installation and wear may cause the opening 61 to deviate from a perfect circle.

The ramming apparatus 100 comprises a hammer 101. The hammer 101 may be a conventional pneumatic percussive hammer. An inlet hose 103 fed by manifold 106 has multiple inlets for compressed air from multiple compressors. Air lines 104 supply air to the tool for reverse operation. An exemplar air hammer 101 and ramming apparatus is shown in U.S. Pat. No. 5,494,116, issued to Wentworth. The ramming apparatus 100 comprises a conical nose 102 at one end.

The adapter kit 50 is used to expand the diameter at which ramming force is provided to the pipe section 60. Thus, a large pipe 60 may be installed by a substantially smaller ramming apparatus 100. As an example, the pipe 60 may be 60" to 108" in diameter, while the ramming apparatus 100 may have an effective diameter of 36"-48".

Figure 2:
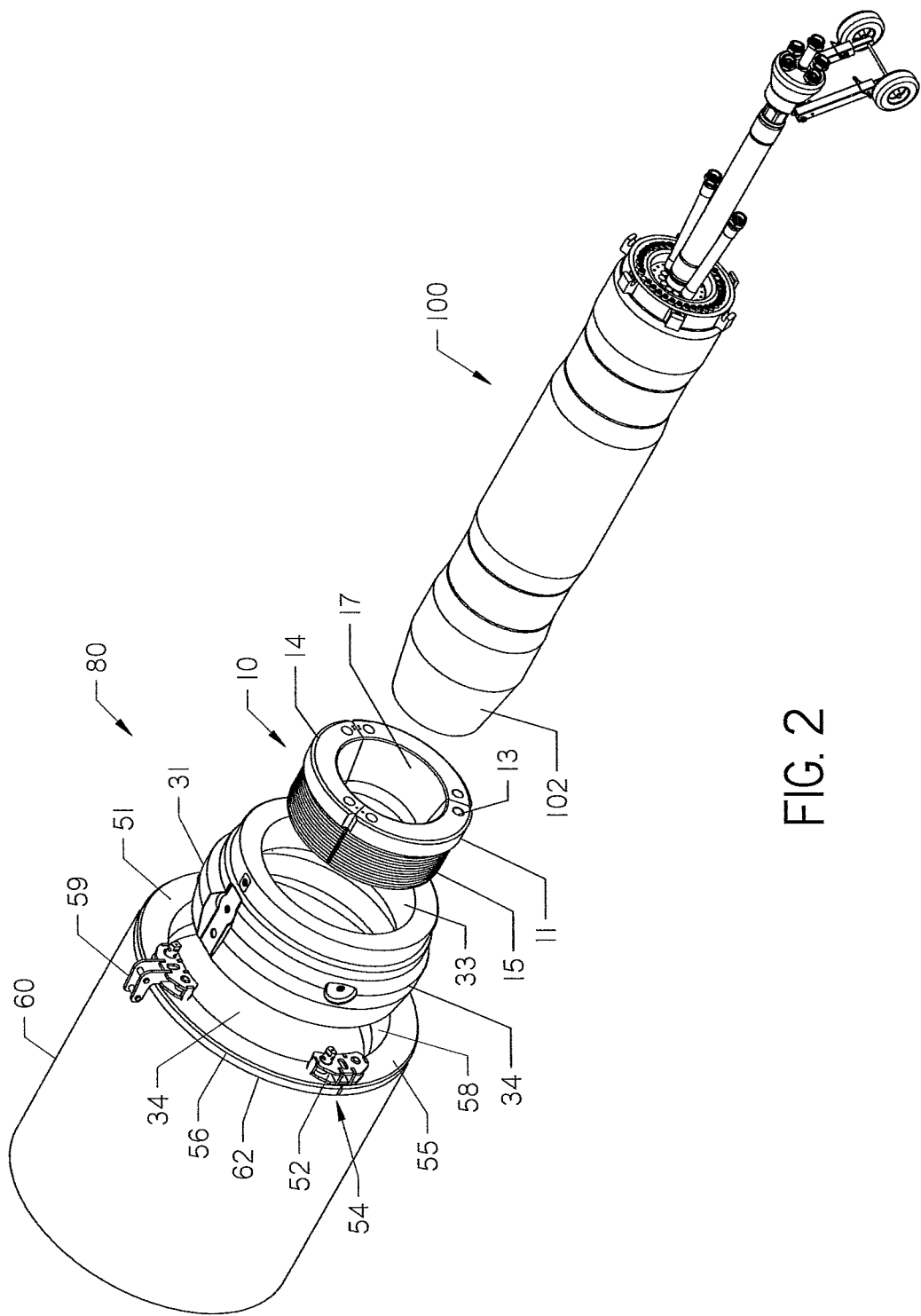
FIG. 2 is a partially exploded view of another adapter kit for use with a pipe ramming apparatus and a pipe segment.
Figure 3:
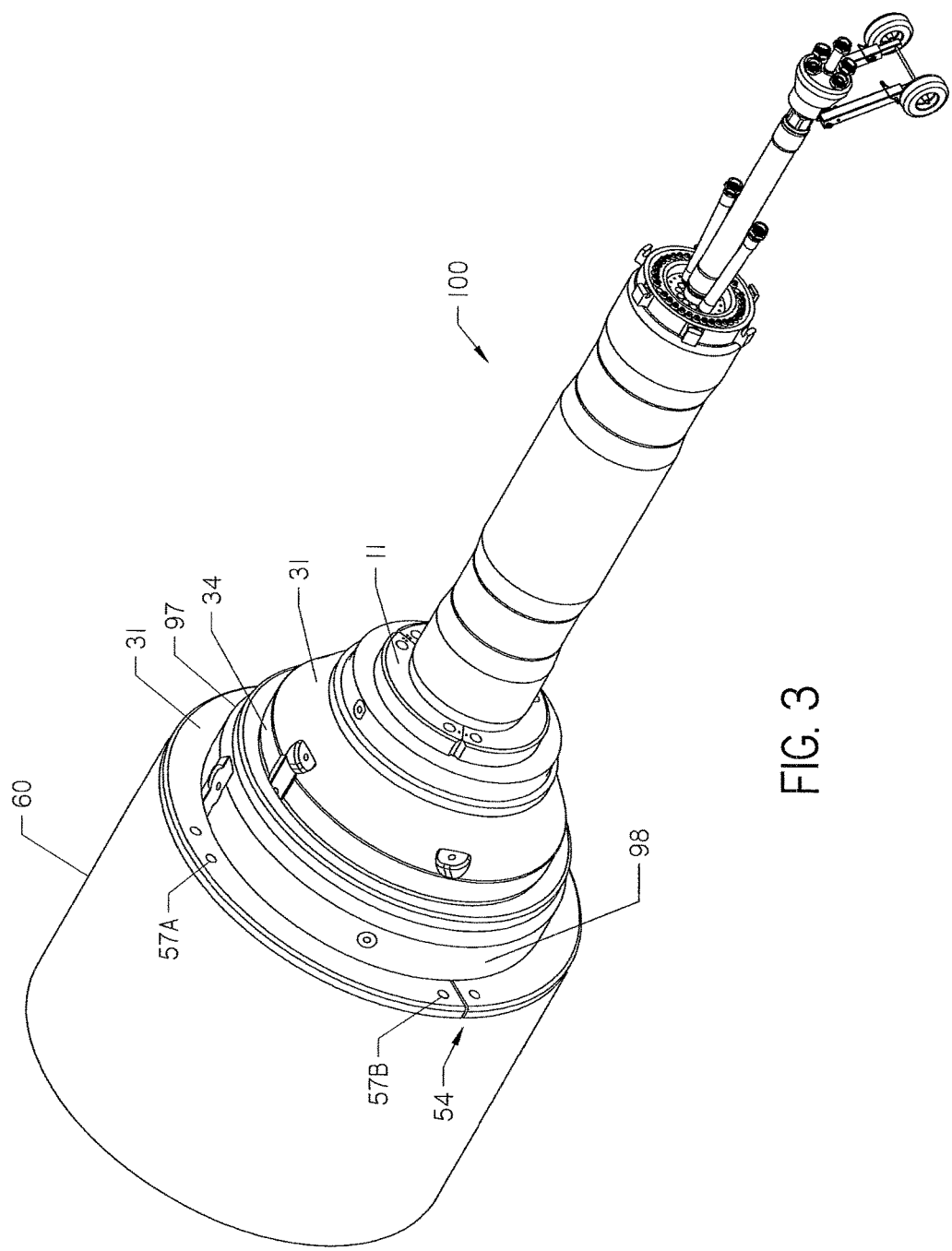
FIG. 3 is an isometric view of another adapter kit for use with a pipe ramming apparatus and a pipe segment.

With reference to FIGS. 1-3, the adapter kit 50 may have several configurations. In FIG. 1, the adapter kit 50 comprises a collet set 10 and a two-piece split ring 51.

The collet set 10 is made up of two or more individual collet segments 11. As shown in FIGS. 1-3, there are three collet segments 11. The collet segments 11 have a pilot section 15 and a flange 14. The pilot section 15 may have a cylindrical or a frustoconical external profile. As shown in FIG. 1, the flange 14 may bear against the inside diameter and the face of the split ring 51. Collet segments 11 may have axially directed through-holes 13 to facilitate handling and placement.

In one embodiment, an internal surface 17 (FIG. 2) formed by the collet segments 11 is complementary to the surface of a cone. In particular, these collet segments 11 have an internal surface 17 that is complementary to the conical nose 102 of the ramming apparatus 100. Pushing the conical nose 102 into the internal surface 17 tends to force the collet segments 11 forward and apart.

Figure 5:
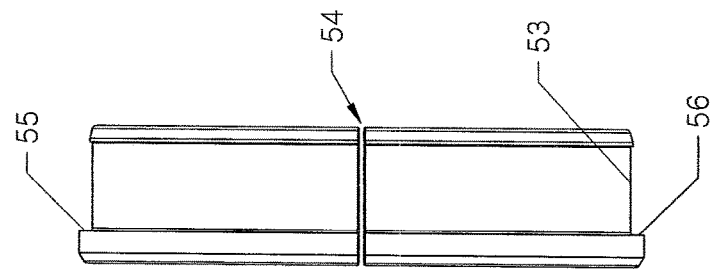
FIG. 5 is a side view of the split ring of FIG. 4.
Figure 4:
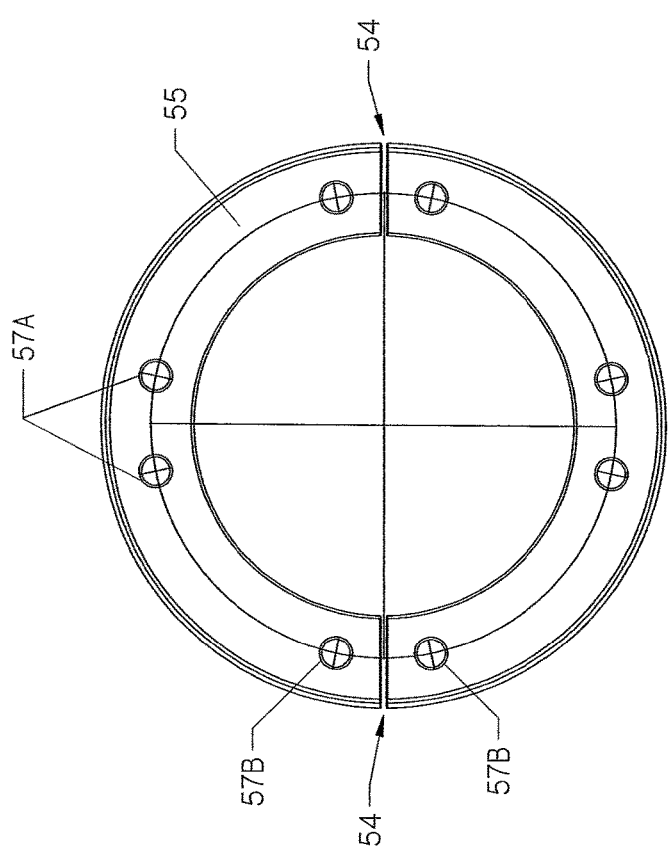
FIG. 4 is a front view of a split ring for use in the kits of FIGS. 1-3.

As best shown in FIGS. 4 and 5, the two-piece split ring 51 is composed of two ring portions, or halves 55, though more sections of split ring than two may be utilized. Between ring halves 55 is an adjustable gap 54. The gap 54 is adjustable by manipulating a cam connector 52 (FIG. 1). The cam connector 52 may have an arm 59 to enable the split ring 51 to be lifted and manipulated. Thus, while not the primary function of a cam connector 52, addition of an arm 59 may enable the connector to be utilized as a lifting device.

The split ring 51, and thus each ring half 55, comprises a pilot section 53 and a flange 56. The pilot section 53 has a convex exterior surface approximating a cylindrical segment. The flange 56 may bear against the face 62 of the pipe 60. When expanded, as discussed in more detail below, the exterior surface of pilot section 53 bears against the inner surface 49 of the pipe or culvert 60.

The split ring 51, and thus each ring half 55, may further comprise a concave internal surface 58 (FIG. 2). The internal surface 58 may have a female taper, or may be complementary to a cylinder. The collet set 10 (FIG. 1) or other structures, as shown in FIGS. 2 and 3, press into the ring 51 and tend to cause the halves 55 to expand. Expansion forces placed on the internal surface 58 by these structures press the split ring 51 into the internal surface 49 of the pipe 60.

Paired holes 57A, 57B are positioned for connection to the cam connectors 52. Paired holes 57A are located on the same ring half 55, and suitable for placement of a connector 52 with the arm 59 used for lifting the ring half 55 or connected split ring 51. Paired holes 57B include one hole on each ring half 55. The cam connector 52 straddles gap 54 when positioned in paired holes 57B.

With reference to FIGS. 6A and 6B, a cam connector 52 is shown in detail. The cam connector 52 comprises a stationary pin 65, a frame 67 and a cam pin 63. The stationary pin 65 has a center axis 70 and may be rigid relative to the frame 67. The stationary pin 65 may be attached to the frame 67 by a weld.

The cam pin 63 is generally elongate along a center axis 69 and may rotate relative to the frame 67. A cam upset 64 is formed on the cam pin 63. The cam upset 64 has a center axis 71 and rotates within a bore in frame 67 about axis 71. The axis 71 of cam upset 64 is offset from the axis 69 of the cam pin 63. Thus, rotation of the cam pin 63 modifies the position of the center axis 69 relative to the frame 67. In turn, this rotation adjusts the distance between axis 69 and axis 70 of pins 63 and 65. Thus, rotation of cam pin 63 adjusts the size of the gap 54. In one embodiment, the gap may be modified between zero and 0.75".

The cam pin 63 may be rotated by a wrench on flats. Alternatively, a cross hole 68 may allow torque to be applied by a lever 80 (FIGS. 7A, 7C, 7E). A removable shear pin 66 may secure the cam connector 52 within each split ring half 55.

In FIGS. 7A-7F, the cam connector 52 is shown in three different orientations. Each orientation rotates the cam pin 63 such that the gap 54 between ring halves 55 changes. The illustration of FIGS. 7A-7F is not to scale so that variations are clear.

In FIGS. 7A and 7B, the upset 64 is positioned with the axis 71 (FIG. 6A) of its volume further from the gap 54 than the center axis 69 (FIG. 6A) of the cam pin 63. Thus, the position of the axis 69 of cam pin 63 is closest to the fixed pin 65. The gap 54 is in its minimum condition.

Figure 7D:
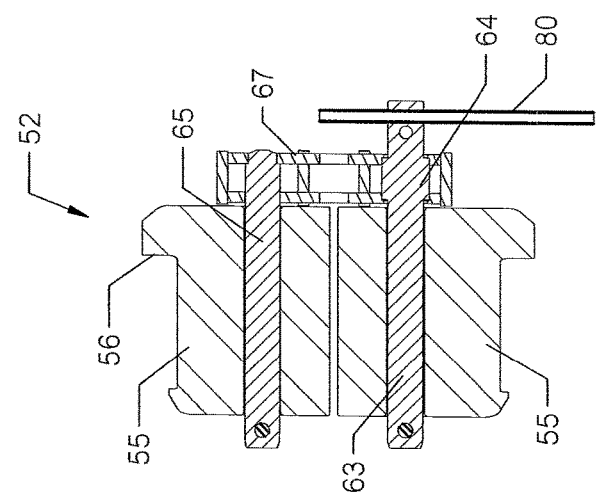
FIG. 7D is a sectional view of the split ring and connector of FIG. 7C taken along line B-B.
Figure 7C:
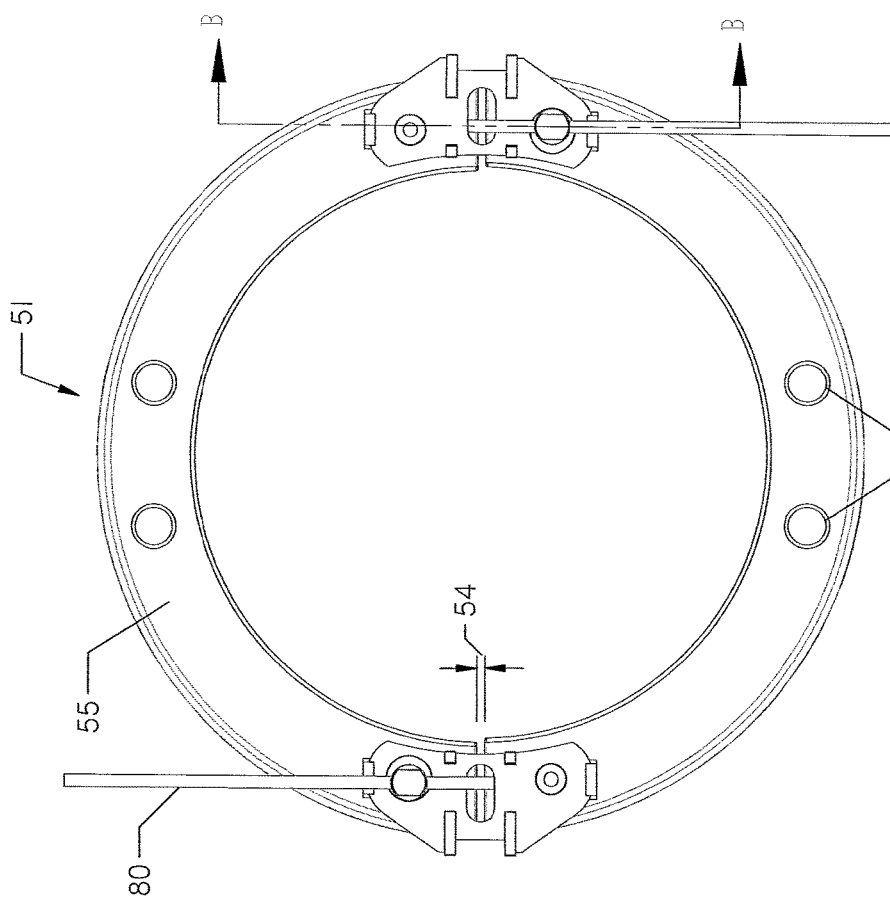
FIG. 7C is a front view of the split ring and connector of FIG. 7A in an intermediate condition.

In FIGS. 7C and 7D, the lever 80 has been rotated a quarter turn. The rotation moves the upset 64 within frame 67. As a result, the upset 64 is roughly centered on the cam pin 63. The position of the axis 69 (FIG. 6A) is therefore moved further away from the fixed pin 65. The gap 54 is increased as the pins 63, 65 are moved apart. The gap 54 is in an intermediate condition between its minimum and maximum.

Figure 7F:
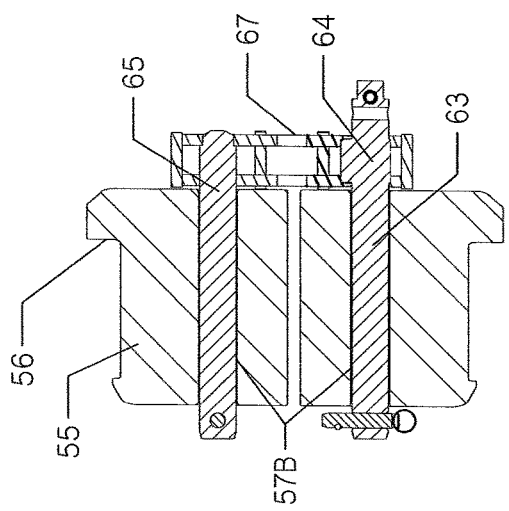
FIG. 7F is a sectional view of the split ring and connector of FIG. 7E taken along line C-C.
Figure 7E:
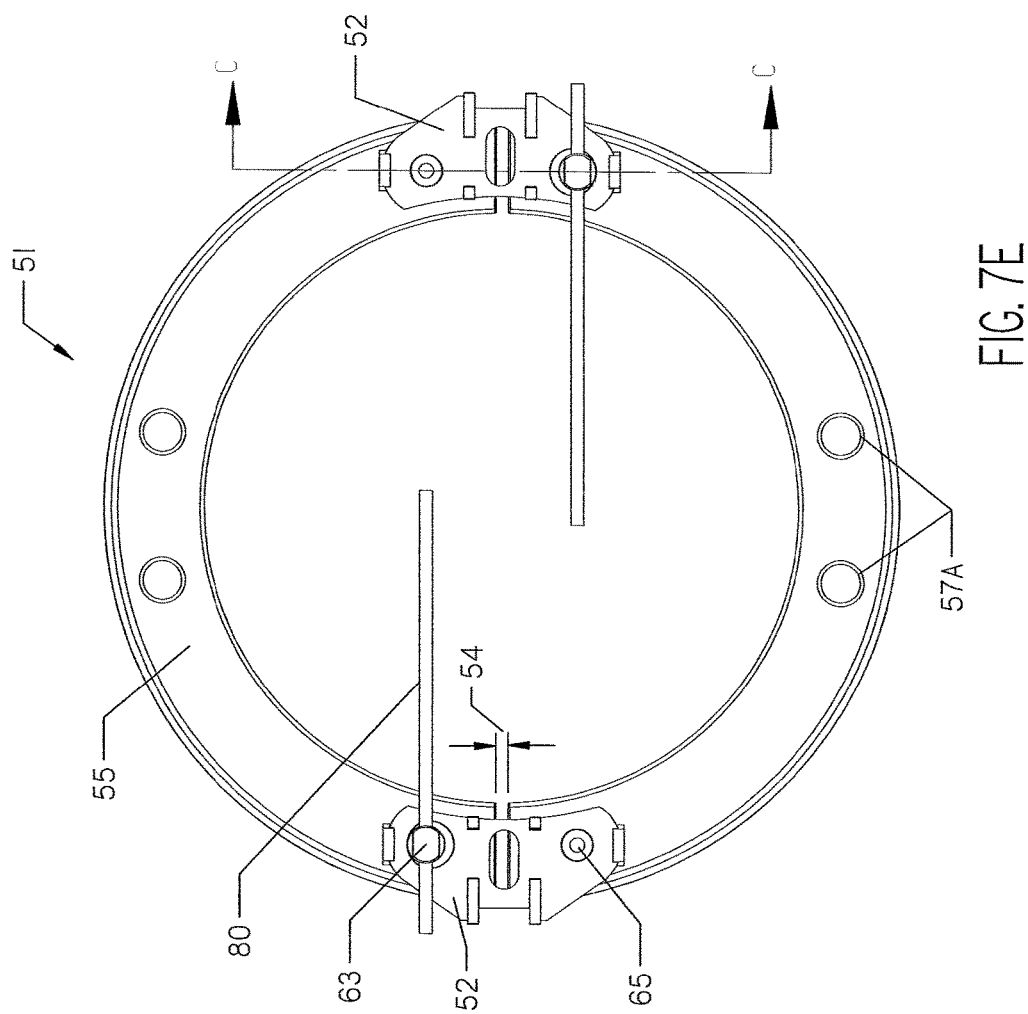
FIG. 7E is a front view of the split ring and connector of FIG. 7A in a maximum condition.

In FIGS. 7E and 7F, the lever 80 has been rotated a further quarter turn. The rotation causes the axis 71 of the upset 64 to be closer to the gap than the axis 69 of the cam pin 63. The gap 54 is at its maximum in this configuration.

The split ring 51 may be installed by manipulating the cam connector 52 such that the gap is in its minimum condition. At the minimum condition, the split ring 51 fits more easily into the opening 61 of the pipe 60. The split ring 51 may then be expanded by rotating the cam pins 63. When expanded inside the opening 61, the pilot section 53 of each ring half 55 pushes against the inner surface 49 of the pipe 60, holding the split ring 51 in place. In FIG. 2, for example, the split ring 51 is shown in place without welding or other attachment. The ring 51 is held by outward force being applied by the ring to the inner surface 49 due to expansion of cam connector 52.

In FIG. 1, the kit 50 allows transfer of force from the smaller diameter ramming machine 100 to the larger pipe 60. Force is transferred from the conical nose 102 of the ramming machine 100 to the internal surface 17 of the collet set 10. Force is likewise transferred from pilot section 15 of the collet set 10 to the internal surface 58 (FIG. 2) of the split ring 51.

With reference to FIG. 2, the kit 50 shown therein further comprises a cone 31. The cone 31 provides a transition between the collet set 10 and the split ring 51. Accordingly, the cone 31 comprises a male taper 34 that bears against the inner surface 58 of the split ring 51. By thrusting the male taper 34 of cone 31 further into the inner surface 58 of split ring 51, the ring 51 tends to expand.

The cone 31 additionally has an internally tapered bore 33 that corresponds to the pilot section 15 of collet set 10 or collet segments 11. Thus, when fully made up, the adapter kit 50 of FIG. 2 transfers thrust and expansion force from the hammer 101 to the collet segments 11. This transfer occurs through the interface between surfaces 102, 17. Force is transferred from the collet segments 11 to the cone 31 through surfaces 15 and 33. Force is transferred from the cone 31 to the split ring 51 through the interface between surfaces 34, 58. Finally, force is transferred from the split ring 51 to the pipe 60 at the flange 56.

As a result the kit 50 uses the cone 31 to adapt the diameter of the ramming machine 100 for use with a much larger pipe 60.

With reference to FIG. 3, a second cone 97 is added to the kit. While shown in an assembled condition, it should be understood that the cone 97 is substantially similar to, but larger than, cone 31. In FIG. 3, the male taper 34 of cone 31 interfaces with a corresponding female taper in second cone 97. The second cone 97 likewise has a taper 98 to interface with the inner surface 58 (FIG. 2) of the split ring.

In FIG. 3, the cam connectors 52 have been removed from holes 57B. As the male taper 98 of the second cone 97 engages the inner surface 58, it pushes the split ring 51 apart, increasing the gap 54. When the entire adapter kit 50 is made up and operating, the expansion force of the taper 98 holds the split ring 51 in place within the opening 61 of the pipe 60. Cam connectors 52 can accordingly be removed, and the split ring 51 may expand beyond the maximum condition.

A similar effect occurs in the kits 50 of FIGS. 1 and 2. The conical pilot section 15 of the collet set 10 and male taper 34 of the cone 31 likewise tend to expand the split ring 51.

Figure 8A:
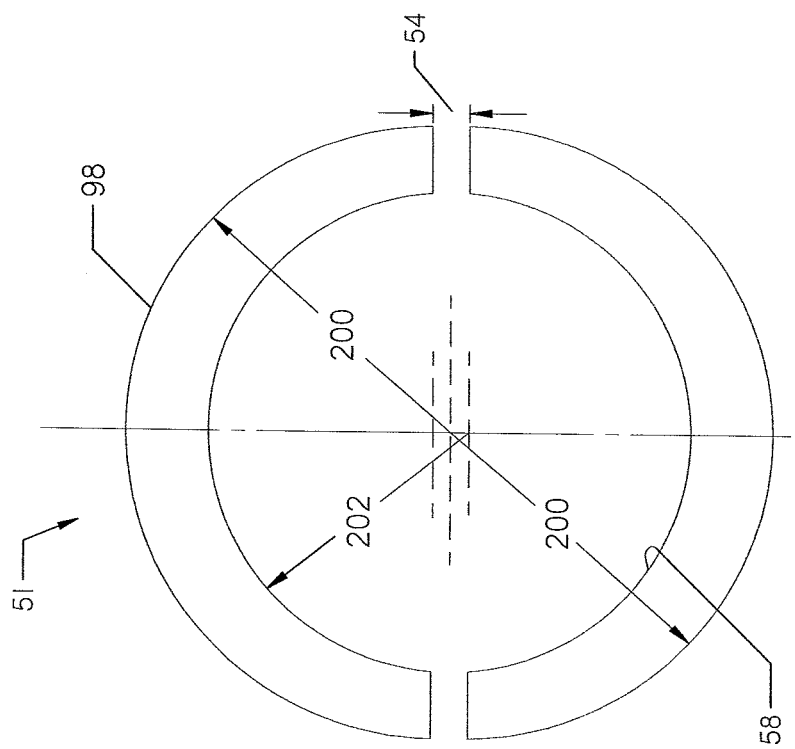
FIG. 8A is a diagrammatic representation of the geometric shape of a split ring in a minimum condition.
Figure 8B:
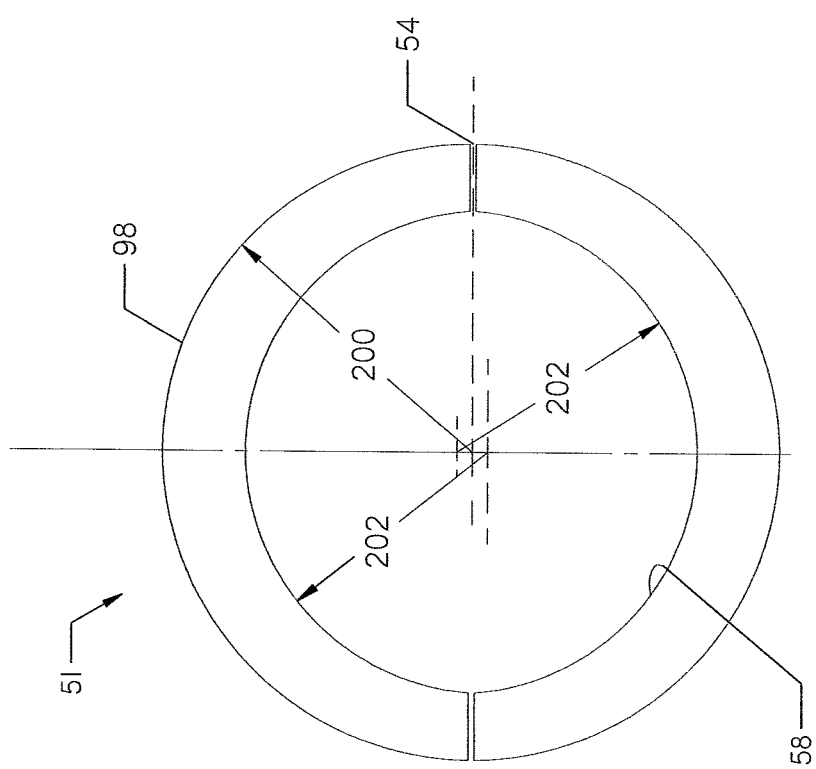
FIG. 8B is a diagrammatic representation of the geometric shape of the split ring of FIG. 8A in a maximum condition.

With reference to FIGS. 8A and 8B, a cross-section of the split ring 51 is shown having an eccentric shape. The collet set 10 or collet segments 11, as shown in FIG. 1, has a substantially circular cross-section when within the split ring 51. However, the gap 54 between ring halves 55 causes the internal and external profiles of the split ring to change as the gap increases and decreases. This may result in the collet segments 11 being less secure when the adapter kit 50 is assembled.

It is advantageous for inner surface 58 to have a circular cross-sectional profile when fully engaged by the collet set 10. Conversely, it is advantageous for an exterior of the split ring 51 to be circular when unexpanded for ease of placement within a pipe 60.

As shown in FIGS. 8A and 8B, this goal is accomplished by causing each ring half 55 to be thicker at its center than at either end. The radius 200 of the exterior 98 is centered directly in the center of the ring 51. The radius 202 of the interior surface 58, however, does not begin at the same location. The result is that the inner surface 58 of the ring half 55 is disposed along an arc of a circle with an internal angle of less than 180 degrees. The outer surface of each ring half 55 may be disposed substantially along a semicircle.

As shown in FIG. 8B, when fully expanded, the radius 202 of each ring half 55 is centered at approximately the same point. Therefore, the inner surface 58 approximates a circular cross-section. The exterior 98 of the split ring 51 is wider at the center of each ring half 55 than at the gaps 54. This may cause the pipe 60 to deform around the ring 51, further increasing the connection between the split ring 51 and the pipe 60. Further, by providing an out-of-round exterior 98, the split ring 51 may better conform to out-of-round pipes 60.

A circumferential shim (not shown) may encircle the pilot section 53 of the two-piece split ring 51 to accommodate various pipe/casing wall thickness within a nominal specified casing size. These shims may be thin and conform across the gap 54 between the ring halves 55.

In operation, a kit 50 comprising a set of collets 10 and a split ring 51 is provided for a ramming operation. The split ring 51 is installed on a pipe by placing a pilot section 53 inside an opening 61 of the pipe. Cam connectors 52 are provided across the gap 54 between the ring halves 55. These connectors 52 are operated to expand the split ring 51. The exterior of pilot section 53 engages an internal surface 49 of the pipe, holding the split ring in place.

The collet set 10 is installed in the split ring 51 such that the pilot section 15 of the collet set is seated against an internal surface 58 of the split ring. The conical nose 102 of the ramming apparatus 100 is then placed inside a corresponding internal surface 17 of the collet set 10.

The ramming device 100 is activated to push the collet set 10, and thus the split ring 51 and the pipe 60. After the initial blows of the ramming device 100, the ring 51 will be fully expanded (FIGS. 7E, 8B). When fully expanded, cam connectors 52 can be removed. Expansion of the collet segments 11 by the conical nose 102 will provide expansion force to the ring halves 55 such that they remain in place. A flange 56 on the ring halves 55 transfers the ramming force of the ramming device 100 to the pipe 60, driving it into the ground.

When the pipe 60 is rammed the appropriate amount, the conical nose 102 may be removed from the collet set 10. The pneumatic hammer 101 may be operated in reverse to aid in removal. Once removed, the collet segments 11 and split ring 51 may be removed from the pipe 60.

While the cam connectors 52 are disclosed herein, other means for maintaining a separation and/or adjusting a gap between the halves 55 of split ring 51 may be anticipated. For example, wedges or shims may be driven into the gaps 54 after placement of the ring 51 into the opening 61. These wedges or shims may be removed upon inception of the ramming operation. Adjustable bolts may be placed between adjacent ends of the halves 55, or other known means for adjusting a gap between two structures may be used.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A kit comprising:
   a split ring, the split ring comprising:
      a first ring portion defining a convex outer surface and a concave inner surface, each of the convex outer surface and concave inner surface extending from a first end to a second end; and
      a second ring portion defining a convex outer surface and a concave inner surface, each of the convex outer surface and concave inner surface extending from a first end to a second end;

two cam connectors having a first pin connectable to an end of the first ring portion, a second pin connectable to an end of the second ring portion, and a middle section connecting the first pin and the second pin;
in which the first pin is rotatable relative to the middle section and comprises an elongate pin end and an upset portion, wherein the upset portion has a longitudinal axis that is offset from a longitudinal axis of the pin end; and
a plurality of collets each having:
an outer surface; and
an inner surface complementary to the surface of a cone.

2. The kit of claim 1 further comprising a first cone, in which the first cone has an inner surface conforming to the outer surface of one of the plurality of collets and an outer surface.

3. The kit of claim 2 in which the outer surface of the first cone conforms to the inner concave surface of the first ring portion and the second ring portion.

4. The kit of claim 2 further comprising a second cone, in which the second cone has an inner surface conforming to the outer surface of the first cone.

5. The kit of claim 1 in which the convex outer surface of the first ring portion follows a semicircular path from the first end to the second end.

6. The kit of claim 5 in which the concave inner surface of the first ring portion follows an arcuate path having an internal angle of less than 180 degrees.

7. The kit of claim 1 in which the middle section of one of the two cam connectors comprises an arm, such that the first ring portion may be lifted by the arm when the cam connector is attached to the first ring portion.

8. A system comprising:
a pipe segment having an end characterized by an opening and an interior surface;
a split ring comprising:
a first ring segment, disposed along an arcuate path from a first end to a second end, having a convex surface and a concave surface extending from the arcuate path; and
a second ring segment, disposed about an arcuate path from a first end to a second end, having a convex surface and a concave surface extending from the arcuate path;
in which the convex surface of the first ring segment and the second ring segment conform to a portion of the interior surface of the pipe segment; and
a means for adjusting a gap between the first ring segment and the second ring segment;
a set of expanding collets having an inner surface and an outer surface;
a reciprocating hammer having a conical nose, in which the conical nose is engaged with the inner surface of the set of collets; and
a first cone with an exterior taper, in which the first cone is disposed about the outer surface of the set of expanding collets.

9. The system of claim 8 in which the means for adjusting the gap between the first ring segment and the second ring segment comprises a cam connector, the cam connector comprising:
a frame;
a first pin attached to the frame; and
a rotatable pin attached to the frame and rotatable relative to the frame, the first pin defining an elongate portion and an upset portion;
in which the upset portion rotates within the frame and defines an offset longitudinal axis from the longitudinal axis of the elongate portion; and
in which the first pin is disposed in the first annular ring segment and the rotatable pin is disposed in the second annular ring segment.

10. The system of claim 8 in which the exterior taper is engaged with the concave surface of at least one of the first and second annular ring segments.

11. The system of claim 8 further comprising:
a second cone with an exterior taper and an interior taper;
in which the exterior taper of the first cone is engaged with the interior taper of the second cone; and
in which the exterior taper of the second taper is engaged with the concave surface of at least one of the first and second annular ring segments.

12. The system of claim 8 in which the outer surface of the set of collets is engaged with the concave surface of at least one of the first and second annular ring segments.

13. A method comprising:
placing two portions of a split ring within a section of pipe;
spreading the two portions apart such that the split ring bears against the inner surface of the section of pipe;
placing a set of collets within the split ring;
placing a conical nose of a pneumatic hammer within the set of collets; and
reciprocating the pneumatic hammer in a first direction such that the section of pipe is driven into the ground;
placing a cam connector in adjacent ends of the two portions of the split ring, such that a first pin is in one of the two portions and a second pin is in the other of the two portions, the first pin comprising an upset portion and an elongate portion; and
wherein the step of spreading the two portions apart comprises the step of rotating the first pin such that a longitudinal axis of the upset portion is closer to the second pin than a longitudinal axis of the elongate portion.

14. The method of claim 13 further comprising the step of removing the cam connector from the ends of the two portions after the conical nose has been placed within the set of collets.

15. The method of claim 14 further comprising reciprocating the pneumatic hammer in a second direction to remove the conical nose from the set of collets.

16. The method of claim 13 further comprising rotating the first pin such that a longitudinal axis of the upset portion is further from the second pin than a longitudinal axis of the elongate portion prior to placing the two portions of the split ring within the section of pipe.

17. The method of claim 13 further comprising lifting the two portions of the split ring with an arm attached to the cam connector.

* * * * *